Aug. 25, 1953   O. G. KOPPIUS   2,650,307
INFRARED ANALYZER
Filed May 4, 1950
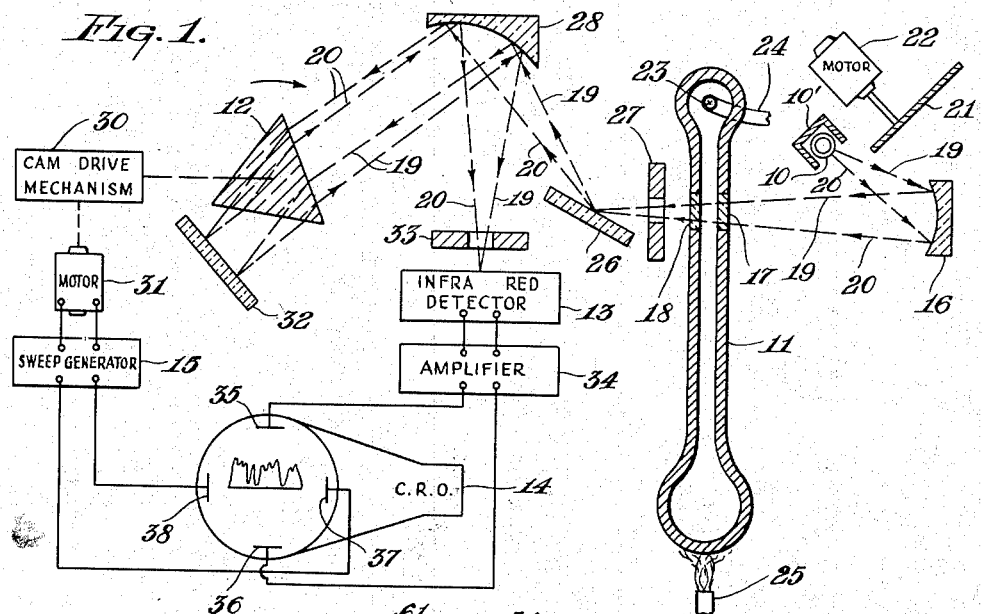
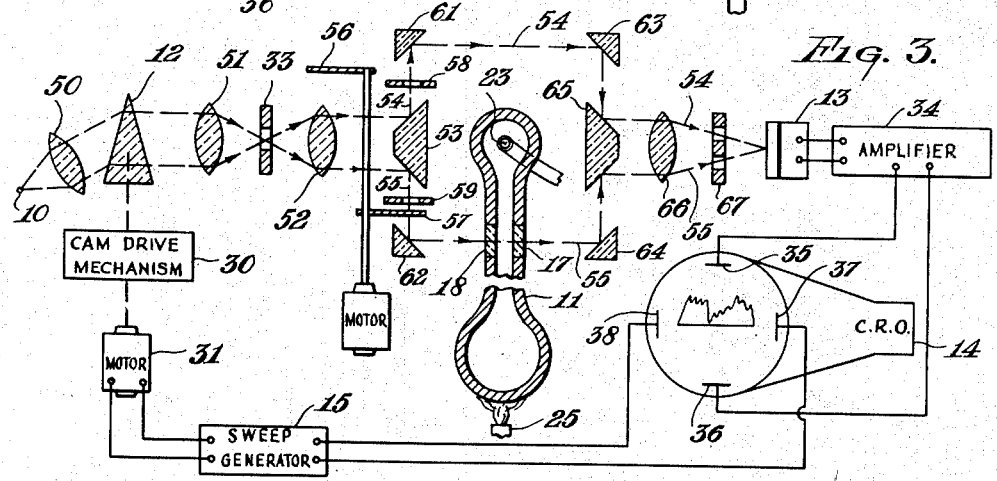
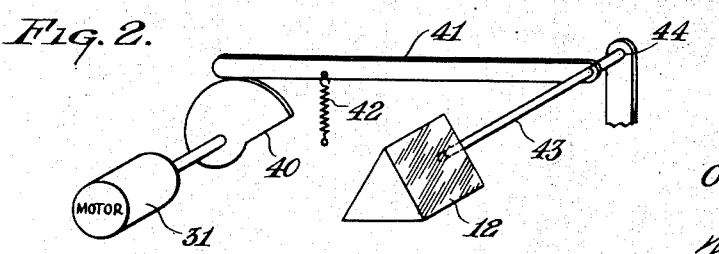
OTTO G. KOPPIUS.
INVENTOR.
BY
AGENT.

Patented Aug. 25, 1953

2,650,307

UNITED STATES PATENT OFFICE 2,650,307

INFRARED ANALYZER

Otto G. Koppius, White Plains, N. Y., assignor to Philips Laboratories, Inc., Irvington-on-Hudson, N. Y.

Application May 4, 1950, Serial No. 159,951

6 Claims. (Cl. 250—43.5)

The present invention relates generally to the determination of the fluid components in a mixture, and more particularly to the determination of fluid components in a mixture by observing the infra-red absorption spectra thereof.

In laboratory analysis it is necessary, in many instances, to determine the percentage composition of mixtures of chemical compounds. For this purpose the process of fractional distillation is frequently employed, separation of the compounds being accomplished by observing the condensation temperature of the gaseous phase, and determining the percentage composition of the mixture by measuring the relative volumes of the individual distillation products. Where only small quantities of the mixture are available, and particularly where the respective boiling points of the compounds are relatively close to each other, it is difficult to determine with precision the composition of the gaseous phase and therefore the cut-points between the different distillation products. Where two compounds in a mixture have substantially the same boiling points, it is very difficult to determine the relative volumes thereof by temperature methods and the results secured thereby are generally inaccurate.

Most chemical compounds exhibit spectra in the infra-red region which are characterized by relatively intense absorption bands when infrared radiation is passed therethrough. The absorption characteristics of different compounds differ to such an extent that they may be employed to accurately determine the cut-points in a fractional distillation process. Where two compounds have substantially the same boiling points, the relative volumes thereof in the mixture may be determined by observation of the absorption spectra of the gaseous combination thereof.

The principal object of the present invention is to provide apparatus for determining the composition of the gaseous phase in a fractional distillation process.

More specifically, it is an object of the invention to provide infra-red apparatus for determining the cut-points in a fractional distillation process.

It is a further object of the invention to provide infra-red apparatus wherein the absorption of the gaseous phase in a fractional distillation process may be continuously observed.

Another object of the invention is to provide infra-red apparatus wherein the difference in wave length characteristics of an unabsorbed beam and a beam passed through the gaseous phase of a fractional distillation process may be continuously observed.

Still another object of the invention is to provide infra-red apparatus to determine the relative volumes of two or more compounds in a mixture where the compounds have substantially the same boiling point.

Further objects of the invention will appear from the following description.

According to the invention, these objects are achieved by providing a source of infra-red radiation, periodically interrupting a beam derived therefrom, passing the interrupted beam through the gaseous phase in a fractional distillation column, passing the interrupted beam through a rotating diffracting prism, directing the refracted beam on an infra-red detector, and applying the output of the detector to the deflecting electrodes of a cathode-ray tube, the sweep of which is synchronized with the rotation of the diffracting prism.

The invention will be described in greater detail with reference to the appended drawing in which:

Figure 1 is a schematic diagram of an arrangement, in accordance with the invention, for observing the infra-red absorption spectra of the gaseous phase of a fractional distillation process, Fig. 2 shows a suitable mechanical drive for the diffracting prism of the arrangement of Fig. 1, and Fig. 3 is a schematic diagram of an arrangement, in accordance with the invention, for observing the difference between the spectra of an unabsorbed infra-red ray and the absorption spectra of the gaseous phase of a fractional distillation process.

Referring now to the drawing and more particularly to Fig. 1, there is shown the basic elements of the infra-red analyzer, comprising a source 10 of infra-red radiation, a fractional distillation column 11, a refracting prism 12, an infra-red detector 13, a cathode-ray oscilloscope 14, and a sweep generator 15.

The rays emitted from the front area of source 10, which are represented by arrow lines 19 and 20, are cast on a concave mirror 16 and are reflected thereby and directed through windows 17 and 18 of distillation column 11. A baffle member 10' is disposed behind source 10 to prevent radiation from the rear and side areas of the source 10.

The rays emitted from source 10 are periodically interrupted by means of a rotating shutter member 21 which is driven at a uniform rate by an electric motor 22.

Windows 17 and 18 of column 11 are positioned in the walls of the column at a point where substantially only vapor is present within the column. The windows 17 and 18 are constructed of a solid material, such as quartz, rock salt, lithium fluoride or silver chloride, which will transmit radiation of the wavelengths absorbed by the vapor present in the column at the level of the windows. The windows may, if desired, be formed of a substance which will serve as a filter for filtering out the wavelengths remote from those required for the analysis. The rays are passed through the vapor just prior to removal of the vapor from the column through a valve 23 and a tube 24. The mixture to be distilled is located in the bottom of column 11 and the temperature thereof is raised to the boiling points of the various constituents by means of a heat source 25.

Mirror 16 is so positioned that the rays deflected therefrom are caused to converge at a point on the surface of a plane mirror 26 after having passed through windows 17 and 18 and a mask 27.

The rays reflected from the point on mirror 26 are cast on a concave off-axis parabolic mirror 28 and are reflected thereby as a substantially collimated beam. The beam projected by mirror 28 is passed through refracting prism 12, which may be constructed of a material such as sodium chloride, lithium fluoride or quartz. Prism 12 is rotated in accordance with the rotation of a cam drive mechanism 30 driven by an electric motor 31, the operation of which is controlled by sweep generator 15 in a manner which will be described hereinafter.

The rays refracted by prism 12 are reflected from the surface of a plane mirror 32, passed again through prism 12, and cast on the surface of mirror 28. The refracted rays incident on mirror 28 comprise many wavelengths. For a given relative positioning of prism 12 and mirror 28, rays of only one wavelength, or of a very narrow band of wavelengths, will be directed from mirror 28 through a mask 33 and caused to converge at a point on the surface of infra-red detector 13. Rays of all other wavelengths will be directed to other points and hence will not impinge on detector 13. By causing prism 12 to rotate, the particular wavelength prism will impinge on detector 13 can be varied.

Detector 13 is preferably in the form of a thermistor detector or a lead sulfide cell having an exposed thermally-responsive element. Infra-red radiation incident on this thermally-responsive element produces an output voltage wave which is applied to the input terminals of an amplifier 34. The amplified voltage wave output of amplifier 34 is applied to vertical deflecting electrodes 35 and 36 of cathode-ray oscilloscope 14.

Horizontal deflecting electrodes 37 and 38 of oscilloscope 14 are coupled to sweep generator 15. Both the horizontal sweep of oscilloscope 14 and the rotation of prism 29 are thus controlled by sweep generator 15. Rotation of prism 29 is directly controlled by cam mechanism 30 in such manner that, at the beginning of the sweep, rays having the longest desired wavelength will impinge on the thermally-responsive element of detector 13. As the sweep progresses, prism 12 is caused to rotate thereby causing the wavelength of the rays impinging on the thermally-responsive element to become progressively shorter. At any particular time during the sweep, the intensity of the rays having the corresponding wavelength will be indicated on the screen of oscilloscope 14 by a vertical displacement of the electron beam. By rotation of prism 12 in the opposite direction, the progression of wavelengths impinging on the thermally-responsive element is reversed.

By providing oscilloscope 14 with a screen having the long persistence characteristics, a full pattern will appear on the screen corresponding to the absorption characteristics of the vapor at the level of the windows in column 11. The sweep duration will depend on the response characteristics of the infra-red detector employed and upon the width of the infra-red spectrum to be observed. In a preferred embodiment of the invention employing a thermistor detector, a sweep time of eight seconds was found satisfactory. Use of different heat detectors results in different sweep times.

In order to achieve a fixed pattern on the cathode-ray screen, the sweep time of the oscilloscope 14 must correspond to a fixed rotation of prism 12. The rotation of prism 12 may correspond to a sweep of the whole spectrum or of a fixed portion thereof, such as 8 to $10\mu$. The rate of rotation of prism 12 may bear an integral relationship with the sweep time of oscilloscope 14. It is, however, preferable to employ a non-linear correspondence determined primarily by the dispersion characteristics of prism 12 so that the horizontal scale of oscilloscope 14, which represents wavelength, will not be distorted. This may be accomplished by incorporating cam drive mechanism 30 in the mechanical linkage between motor 31 and prism 12.

A suitable arrangement of cam drive mechanism 30 is shown in Fig. 2, where motor 31 produces rotation of a cam 40. The configuration of cam 40 is determined by the wavelength dispersion characteristics of prism 12. A bar 41, which is urged towards cam 40 by a spring 42 travels in a vertical direction in accordance with the configuration of cam 40. This vertical motion is transformed into rotary motion of a shaft 43 by a pivot arrangement 44. The rotary motion of shaft 43 produces a rotation of prism 12.

Referring now to Fig. 3, there is shown another arrangement in accordance with the invention for observing the infra-red absorption pattern of the gaseous phase in a fractional distillation column. Elements in Fig. 3 corresponding with elements in Fig. 1 are designated by the same reference numerals. The operation of the arrangement of Fig. 3 corresponds substantially to that of Fig. 1 except that in Fig. 3 a second infra-red beam, in addition to the beam passed through the windows of the distillation column, is provided. This second beam is applied to the thermally-responsive element of infra-red detector 13 without absorption, so that the pattern developed on the screen of oscillograph 14 represents a combination of the unabsorbed beam and the beam absorbed by the vapor in column 11.

In Fig. 3, the rays from one area of infra-red source 10 are cast on a collimating lens 50 where they are directed through rotating dispersion prism 12, the rotation of which is synchronized with the sweep of cathode-ray oscilloscope 14 in the same manner as in Fig. 1. The rays of the wavelength or wavelength band selected by prism 12 are collected by a condenser lens 51 and concentrated so as to pass through baffle aperture 33 and onto a collimating lens 52. Lens 52 projects a collimated beam onto the mirrors of a double reflector 53 which splits the beam into two beams 54 and 55.

Beams 54 and 55 are alternately interrupted by rotating shutter members 56 and 57 which are driven at a uniform rate on a common shaft by an electric motor 60. Shutter members 56 and 57 are formed by semi-circular plates which are affixed to the shaft at positions displaced 180° from each other. Shutter 56 is operatively interposed in the path of beam 54 between mirrors 53 and 61 and cooperates with a stationary mask 58 having a port shaped as the segment of a circle and arranged to accommodate beam 54. Shutter 57 is operatively interposed in the path of beam 55 between mirrors 53 and 62 and cooperates with a similar mask 59 having a port to accommodate beam 55. Shutter members 56 and 57 are arranged so that each interrupts a respective beam during a respective half-cycle of rotation of the shaft of motor 60. In this way each beam is interrupted during alternate equal intervals of time.

Beam 54 is reflected from mirror 61 onto a mirror 63. Beam 55 is reflected from mirror 62 through windows 17 and 18 of distillation column 11 onto a mirror 64. Beams 54 and 55 are reflected from mirrors 63 and 64, respectively, onto respective surfaces of mirror 65 and are cast on a lens 66. Lens 66 focuses beams 54 and 55 and directs them through respective ports of a mask 67 onto infra-red detector 13.

Detector 13 is coupled to cathode-ray oscilloscope 14 through amplifier 34 in the same manner as in Fig. 1. Similarly, the horizontal sweep of oscilloscope 14 and the rotation of lens 12 correspond to the arrangement of Fig. 1.

While I have described my invention in a specific use thereof and in specific embodiments, I do not wish to be limited thereto for obvious modifications will occur to those skilled in the art without departing from the spirit and scope of the invention.

What is claimed is:

1. Apparatus for determining the composition of a mixture of chemical compounds, comprising a source of infra-red radiant energy, means to derive from said source an analyzing beam having a given intensity, means including a fractional distillation column for said mixture provided with windows permeable to infra-red radiation for transmitting said beam through fluid obtained from said mixture and to derive from said fluid a resulting beam having selective components thereof attenuated, an infra-red detector for developing a voltage proportional to incident radiation, means to direct said resulting beam onto said detector, optical means for diffracting said beam interposed between said source and said detector to provide a spectrum range and arranged to select a desired wavelength band of said range for direction onto said detector, means to adjust said optical means to vary the selection of the wavelength band directed onto said detector, an oscillograph element coupled to said detector and having a deflectable beam, and means to deflect said deflectable beam in synchronism with the selection of the wavelength band directed onto said detector.

2. Apparatus for determining the composition of a mixture of chemical compounds, comprising a source of infra-red radiant energy, means to derive from said source an analyzing beam having a given intensity, means including a fractional distillation column for said mixture provided with windows permeable to infra-red radiation for transmitting said beam through fluid obtained from said mixture and to derive from said fluid a resulting beam having selective components thereof attenuated, an infra-red detector for developing a voltage proportional to incident radiation, means to direct said resulting beam onto said detector, a dispersion prism for diffracting said beam interposed between said source and said detector to provide a spectrum range and arranged to select a desired wavelength band of said range for direction onto said detector, means to vary the position of said prism to vary the selection of the wavelength band directed onto said detector, an oscillograph element coupled to said detector and having a deflectable beam, and means to deflect said deflectable beam in synchronism with the selection of the wavelength band directed onto said detector.

3. Apparatus for determining the composition of a mixture of chemical compounds comprising a fractional distillation column for said mixture provided with windows permeable to infra-red radiation, a source of infra-red radiant energy, means to derive from said source an analyzing beam having a given intensity, means for transmitting said beam through said windows and to derive from vapor produced in said column a resulting beam having selective components thereof attenuated, an infra-red detector for developing a voltage proportional to incident radiation, means to direct said resulting beam onto said detector, a dispersion prism for diffracting said beam interposed between said source and said detector to provide a spectrum range and arranged to select a desired wavelength band of said range for direction onto said detector, a cathode-ray oscilloscope coupled to said detector and having a deflectable beam, means coupled to said oscilloscope to generate a sweep voltage and to apply said sweep voltage to said oscilloscope to deflect said deflectable beam, an electric motor coupled to said generating means, and mechanical means intercoupling said motor and said prism to rotate said prism to thereby vary the selection of the wavelength band directed onto said detector in synchronism with the position of said deflectable beam.

4. Apparatus for determining the composition of a mixture of chemical compounds comprising a fractional distillation column provided with windows permeable to infra-red radiation, a source of infra-red radiant energy, means to derive from said source an analyzing beam having a given intensity, means to periodically block said beam, means for transmitting said beam through said windows to derive from vapor produced in said column a resulting beam having selective components thereof attenuated, an infra-red detector for developing a signal voltage proportional to incident radiation, means to direct said resulting beam onto said detector, a dispersion prism having a predetermined wavelength dispersion characteristic which is nonlinear for diffracting said beam interposed between said source and said detector to provide a spectrum range and arranged to select a desired wavelength band of said range for direction onto said detector, an amplifier coupled to said detector for amplifying said signal voltage, a cathode-ray oscilloscope coupled to said amplifier and having a deflectable beam, means coupled to said oscilloscope to generate a sweep voltage and to apply said sweep voltage to said oscilloscope to deflect said deflectable beam, an electric motor coupled to said generating means, and mechanical means comprising a cam mechanism intercoupling said motor and said prism to rotate said prism to thereby vary the selection of the wavelength band directed onto said detector in synchronism with the position of said deflectable beam, said cam having a non-linear configuration correlated to the prism dispersion characteristic as to produce a linear wavelength pattern on said oscilloscope.

5. Apparatus for determining the composition of a mixture of chemical compounds, comprising a fractional distillation column for said mixture provided with windows permeable to infrared radiation, source of infra-red radiant energy, means to derive from said source separate first and second beams having equal intensity, means for transmitting said first beam through said windows to produce selective absorption of said first beam, means for alternately blocking said first and second beams, an infra-red detector for developing a voltage proportional to incident radiation, means to direct said first and second beams onto said detector, optical means for diffracting said beams interposed between said source and said detector to provide a spectrum range and arranged to select a desired wavelength band of said range for direction onto said detector, means to adjust said optical means to vary the selection of the wavelength band directed onto said detector, an oscillograph element coupled to said detector and having a deflectable beam, and means to deflect said deflectable beam in synchronism with the selection of the wavelength band directed onto said detector.

6. Apparatus for determining the composition of a mixture of chemical compounds comprising a fractional distillation column for said mixture provided with windows permeable to infra-red radiation, a source of infra-red radiant energy, means to derive from said source separate first and second beams having equal intensity, means for transmitting said first beam through said windows to produce selective absorption of said first beam, means for alternately blocking said first and second beams, an infra-red detector for developing a voltage proportional to incident radiation, means to direct said first and second beams onto said detector, a dispersion prism for diffracting said beams interposed between said source and said detector to provide a spectrum range and arranged to select a desired wavelength band of said range for direction onto said detector, a cathode-ray oscilloscope coupled to said detector and having a deflectable beam, means coupled to said oscilloscope to generate a sweep voltage and to apply said sweep voltage to said oscilloscope to deflect said deflectable beam, an electric motor coupled to said generating means, and mechanical means comprising a cam mechanism intercoupling said motor and said prism to rotate said prism to thereby vary the selection of the wavelength band directed onto said detector in synchronism with the position of said deflectable beam.

OTTO G. KOPPIUS.

References Cited in the file of this patent

UNITED STATES PATENTS

| Number | Name | Date |
| --- | --- | --- |
| 2,193,606 | Ulrey | Mar. 12, 1940 |
| 2,437,323 | Heigl et al. | Mar. 9, 1948 |
| 2,444,560 | Feldt et al. | July 6, 1948 |
| 2,483,746 | White | Oct. 4, 1949 |
| 2,502,319 | Golay | Mar. 28, 1950 |
| 2,503,165 | Meyer | Apr. 4, 1950 |
| 2,547,212 | Jamison et al. | Apr. 3, 1951 |

OTHER REFERENCES

Nature, August 10, 1946, pages 196–197.